United States Patent
Weaver

(10) Patent No.: US 9,863,260 B2
(45) Date of Patent: Jan. 9, 2018

(54) HYBRID NOZZLE SEGMENT ASSEMBLIES FOR A GAS TURBINE ENGINE

(71) Applicant: General Electric Company, Schenectady, NY (US)

(72) Inventor: Matthew Mark Weaver, Loveland, OH (US)

(73) Assignee: General Electric Company, Schenectady, NY (US)

(*) Notice: Subject to any disclaimer, the term of this patent is extended or adjusted under 35 U.S.C. 154(b) by 338 days.

(21) Appl. No.: 14/672,380

(22) Filed: Mar. 30, 2015

(65) Prior Publication Data

US 2016/0290147 A1    Oct. 6, 2016

(51) Int. Cl.
*F02C 7/20* (2006.01)
*F01D 9/04* (2006.01)
(Continued)

(52) U.S. Cl.
CPC ............. *F01D 9/047* (2013.01); *F01D 9/041* (2013.01); *F01D 9/042* (2013.01); *F01D 25/005* (2013.01);
(Continued)

(58) Field of Classification Search
CPC ... F01D 9/02; F01D 9/04; F01D 9/041; F01D 9/042; F01D 9/047; F01D 25/246;
(Continued)

(56) References Cited

U.S. PATENT DOCUMENTS

| 5,284,011 A | * | 2/1994 | Von Benken | F01D 5/26 248/554 |
| 6,098,395 A | | 8/2000 | North | |

(Continued)

FOREIGN PATENT DOCUMENTS

| CN | 201818331 U | 5/2011 |
| CN | 202900330 U | 4/2013 |

(Continued)

OTHER PUBLICATIONS

European Search Report and Opinion issued in connection with Corresponding EP Application No. 16162930.8 dated Aug. 9, 2016.

(Continued)

*Primary Examiner* — Andrew Nguyen
(74) *Attorney, Agent, or Firm* — General Electric Company; William Scott Andes

(57) ABSTRACT

A nozzle segment assembly for a gas turbine engine may generally include inner and outer ring support segments and a nozzle fairing positioned between the inner and outer ring support segments. The nozzle fairing may be formed from a ceramic matrix composite (CMC) material and may include both an outer endwall and an inner endwall. In addition, the nozzle fairing may include a strut vane extending between the inner and outer endwalls. The nozzle segment assembly may also include a metallic strut extending through the strut vane between the outer and inner ring supports and at least one secondary vane configured to be received through at least one of the outer endwall or the inner endwall of the nozzle fairing such that the at least one secondary vane extends between the inner and outer endwalls at a location adjacent to the strut vane.

20 Claims, 5 Drawing Sheets

(51) Int. Cl.
*F01D 25/00* (2006.01)
*F02C 3/04* (2006.01)

(52) U.S. Cl.
CPC .................. *F02C 3/04* (2013.01); *F02C 7/20* (2013.01); *F05D 2220/32* (2013.01); *F05D 2240/128* (2013.01); *F05D 2240/35* (2013.01); *F05D 2260/941* (2013.01); *F05D 2300/175* (2013.01); *F05D 2300/607* (2013.01); *F05D 2300/6033* (2013.01); *Y02T 50/672* (2013.01); *Y02T 50/673* (2013.01)

(58) Field of Classification Search
CPC ...... F01D 5/284; F02C 7/20; F05D 2240/128; F05D 2240/90; F05D 2240/91
See application file for complete search history.

(56) References Cited

U.S. PATENT DOCUMENTS

| | | |
|---|---|---|
| 7,114,917 B2 | 10/2006 | Legg |
| 8,292,580 B2 | 10/2012 | Schiavo et al. |
| 2008/0279679 A1* | 11/2008 | Morrison ................ F01D 9/042 415/191 |
| 2010/0068034 A1* | 3/2010 | Schiavo ................ F01D 5/189 415/115 |
| 2011/0171018 A1* | 7/2011 | Garcia-Crespo ........ F01D 9/042 415/208.2 |
| 2014/0161623 A1 | 6/2014 | Zurmehehly et al. |
| 2014/0212284 A1 | 7/2014 | Jamison et al. |

FOREIGN PATENT DOCUMENTS

| | | |
|---|---|---|
| EP | 2009243 A2 | 12/2008 |
| JP | 2011-043118 A | 3/2011 |

OTHER PUBLICATIONS

First Office Action and Search issued in connection with corresponding CN Application No. 201610190001.6 dated Feb. 23, 2017.
Search Report issued in connection with corresponding JP Application No. 2016-057768 dated Mar. 28, 2017.
Notification of Reasons for Refusal issued in connection with corresponding JP Application No. 2016-057768 dated Apr. 4, 2017.

* cited by examiner

HYBRID NOZZLE SEGMENT ASSEMBLIES FOR A GAS TURBINE ENGINE

FIELD OF THE INVENTION

The present subject matter relates generally to gas turbine engines and, more particularly, to a hybrid nozzle segment assembly for a gas turbine engine.

BACKGROUND OF THE INVENTION

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage." Typically two or more stages are used in serial flow relationship. These components operate in an extremely high temperature environment and, thus, must often be cooled by air flow to ensure adequate service life.

Due to the operating temperatures within the gas turbine engine, it is desirable to utilize materials with low coefficients of thermal expansion. For example, to operate effectively in such strenuous temperature and pressure conditions, composite materials have been developed, such as ceramic matrix composite (CMC) materials. CMC materials provide both temperature and density advantages over metallic materials, thereby making the materials desirable options for manufacturing high temperature, hot gas path components. However, CMC materials also have unique mechanical properties that must be considered during the design and application of such materials within the interior of a gas turbine engine. For example, CMC materials have relatively low tensile ductility or low strain to failure as compared to metallic materials. As a result, CMC-based components are often not equipped to handle significant mechanical loading during operation of the gas turbine engine.

In this regard, attempts have been made to form nozzle vanes from CMC materials to increase the high temperature capabilities of such components. However, these prior attempts have not fully addressed the mechanical loading issues for the nozzle vanes, thereby leading to durability challenges for the CMC-based components.

Accordingly, an improved nozzle segment assembly that provides increased mechanical support for CMC-based nozzle vanes would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a nozzle segment assembly for a gas turbine engine. The nozzle segment assembly may generally include an outer ring support segment and an inner ring support segment. The nozzle segment assembly may include a nozzle fairing positioned between the inner and outer ring support segments. The nozzle fairing may be formed from a ceramic matrix composite (CMC) material and may include both an outer endwall configured to be positioned adjacent to the outer ring support segment and an inner endwall configured to be positioned adjacent to the inner ring support segment. In addition, the nozzle fairing may include a strut vane extending between the inner and outer endwalls. The nozzle segment assembly may also include a metallic strut extending through the strut vane between the outer and inner ring supports and at least one secondary vane configured to be received through at least one of the outer endwall or the inner endwall of the nozzle fairing such that the at least one secondary vane extends between the inner and outer endwalls at a location adjacent to the strut vane.

In another aspect, the present subject matter is directed to a gas turbine engine. The gas turbine engine may generally include a compressor, a combustor in flow communication with the compressor and a turbine configured to receive combustion products from the combustor. The turbine may include a turbine nozzle having an annular array of nozzle segment assemblies. Each nozzle segment assembly may generally include an outer ring support segment, an inner ring support segment and a nozzle fairing positioned between the inner and outer ring support segments. The nozzle fairing may be formed from a ceramic matrix composite (CMC) material and may include both an outer endwall configured to be positioned adjacent to the outer ring support segment and an inner endwall configured to be positioned adjacent to the inner ring support segment. In addition, the nozzle fairing may include a strut vane extending between the inner and outer endwalls. Each nozzle segment assembly may also include a metallic strut extending through the strut vane between the outer and inner ring supports and at least one secondary vane configured to be received through at least one of the outer endwall or the inner endwall of the nozzle fairing such that the at least one secondary vane extends between the inner and outer endwalls at a location adjacent to the strut vane.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
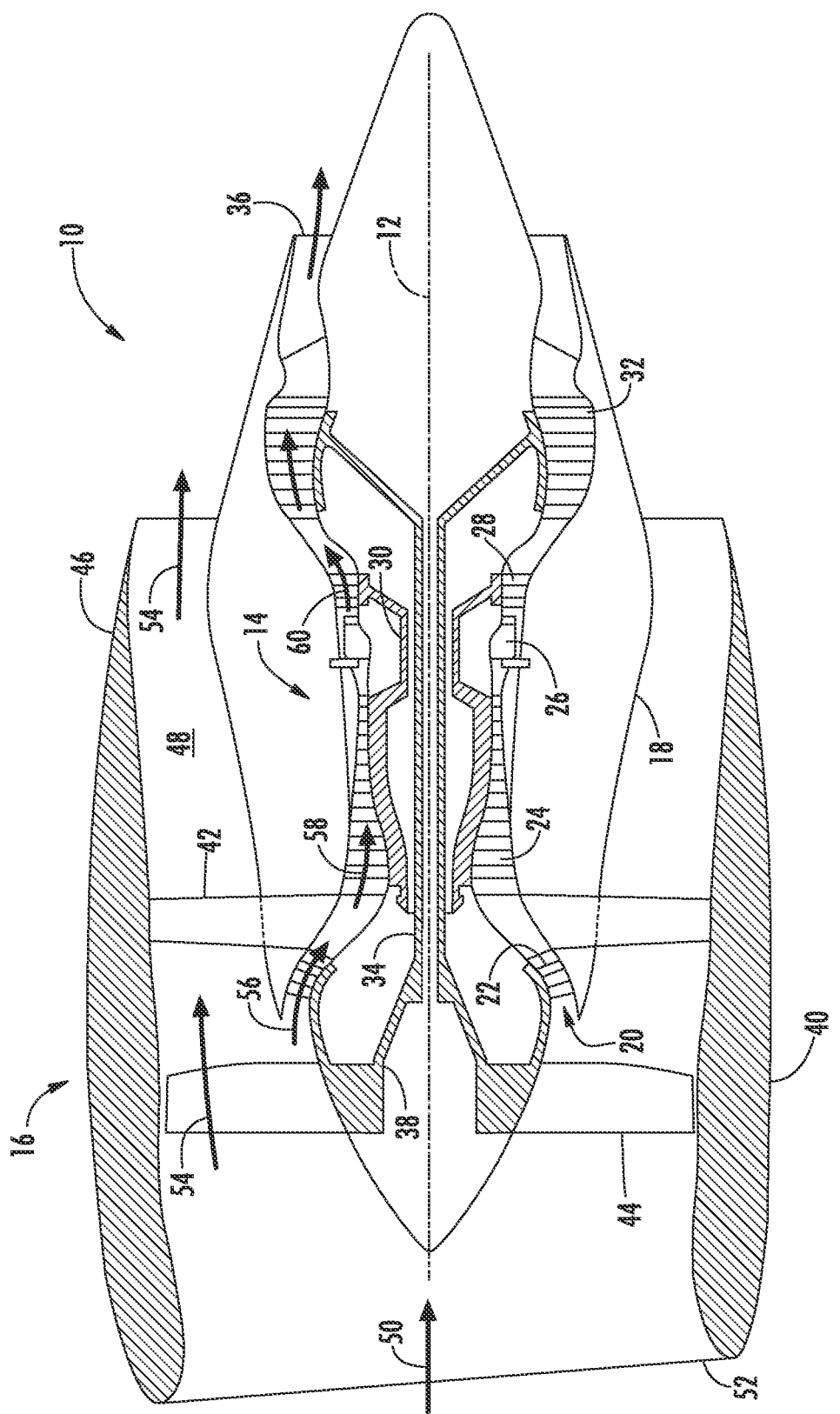
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a nozzle segment assembly forming part of a turbine nozzle for a gas turbine engine. Specifically, in several embodiments, the nozzle segment assembly may include a hybrid CMC/metal vane design, wherein a structural metallic component or strut is shielded from the combustion gases flowing along the hot gas path of the gas turbine engine by a CMC fairing and corresponding CMC endwalls. In addition, the nozzle segment assembly may also include one or more secondary CMC-based vanes configured to be simply supported along-side the CMC shielded strut. For example, in one embodiment, the nozzle segment assembly may correspond to a triplet vane design. In such an embodiment, the nozzle segment assembly may include two secondary CMC-based vanes corresponding to the outer vanes of the assembly, with the CMC fairing serving as the center vane.

It should be appreciated that the disclosed hybrid CMC/metal design may allow for a nozzle segment assembly to be provided the advantages of both CMC- and metallic-based components. For example, the metallic strut may serve to increase the mechanical loading capability of the assembly. In addition, the high temperature capabilities of the various CMC components may serve to reduce the cooling flow requirements for the assembly. Moreover, given their significantly lower densities, the CMC-based components may also serve to reduce the overall weight of the nozzle segment assembly when compared to conventional metallic-based nozzle components.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 30 may generally include one or more turbine stages, with each stage including a turbine nozzle (not shown in FIG. 1) and a downstream turbine rotor (not shown in FIG. 1). As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
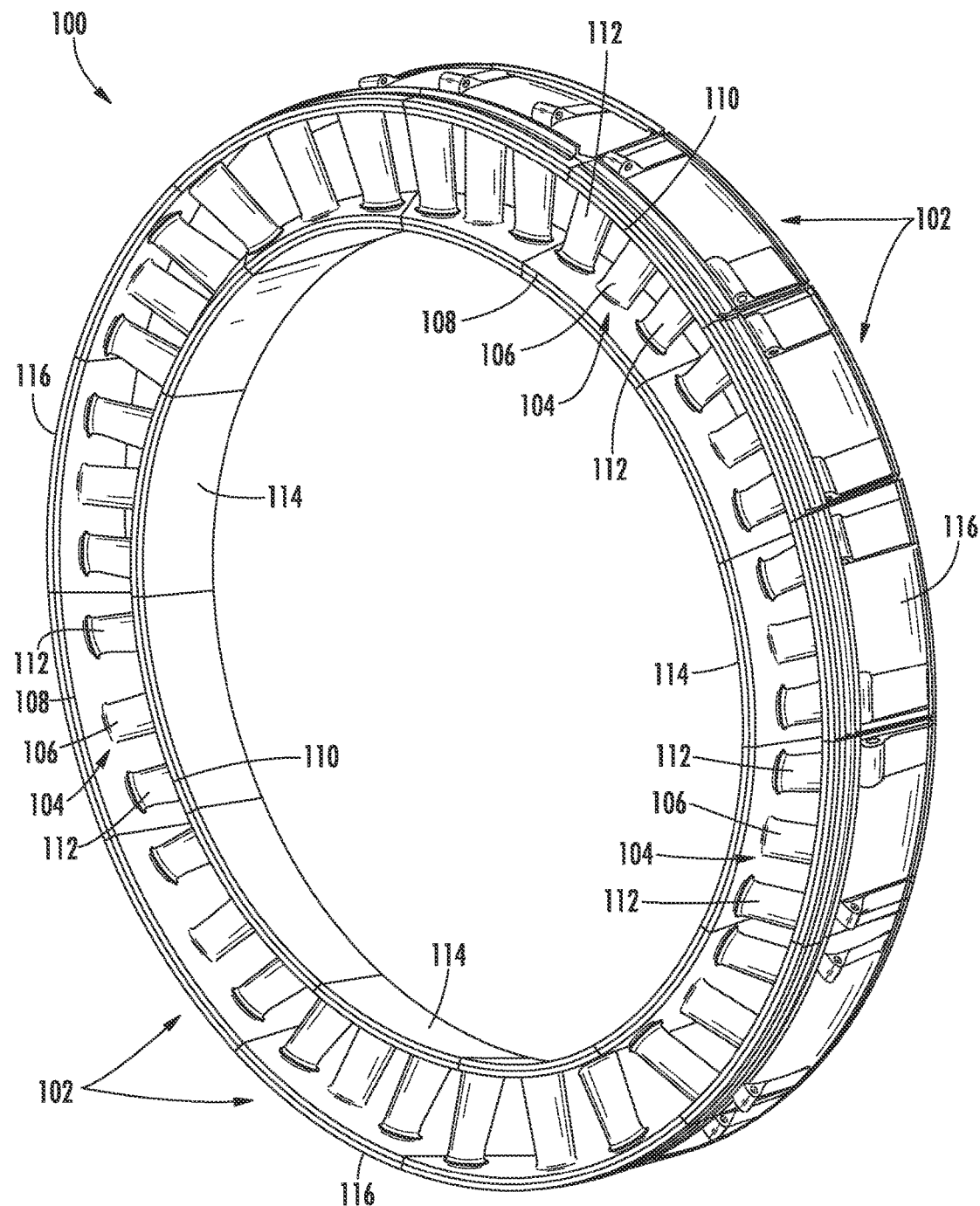
FIG. 2 illustrates a perspective view of one embodiment of a turbine nozzle suitable for use within the gas turbine shown in FIG. 1 in accordance with aspects of the present subject matter.

Referring now to FIG. 2, a perspective view of one embodiment of a turbine nozzle 100 is illustrated in accordance with aspects of the present subject matter. The turbine nozzle 100 may generally be configured to be positioned within any suitable turbine section of a gas turbine engine, such as the first (or high pressure) turbine 28 and/or the second (or lower pressure) turbine 32 of the gas turbine engine 10 described above with reference to FIG. 1.

In general, the turbine nozzle 100 may define a ring-like shape formed by an annular array of nozzle segment assemblies 102. As is generally understood, the nozzle segment assemblies 102 may be configured to direct the combustion gases flowing along the hot gas path of the turbine engine 10 downstream through a subsequent row of rotor blades (not shown) extending radially outwardly from a supporting rotor disk. As shown in FIG. 2, each nozzle segment assembly 102 may include a nozzle fairing 104 having a strut vane 106 extending between radially inner and outer endwalls 108, 110 and one or more secondary nozzle vanes 112 supported between the endwalls 108, 110. Additionally, each nozzle segment assembly 102 may include an inner support ring segment 114 and a hanger or outer support ring segment 116. As shown in FIG. 2, the inner and outer support ring segments 114, 116 may be arranged in an annular array (e.g., about the engine centerline axis 12) so as to define the inner and outer ring-shaped perimeters, respectively, of the turbine nozzle 100. As will be described below, the outer support ring segment 116 of each nozzle segment assembly 102 may generally include a strut (not shown in FIG. 2) extending radially inwardly therefrom that is configured to be received within the strut vane 106 so as to provide structural and load-bearing support for the nozzle segment assembly 102.

Figure 3:
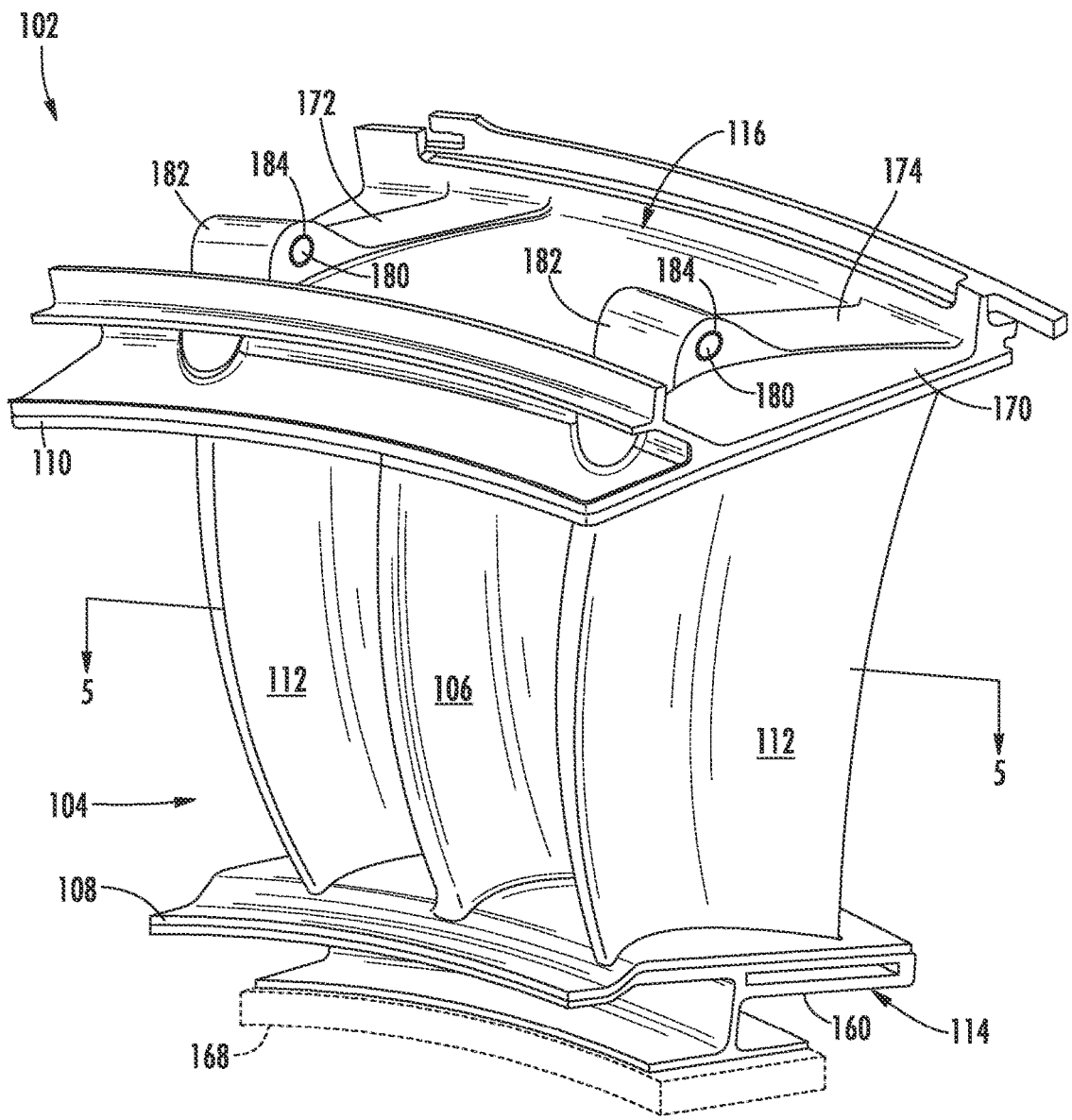
FIG. 3 illustrates a perspective view of one embodiment of a nozzle segment assembly suitable for use within the turbine nozzle shown in FIG. 2 in accordance with aspects of the present subject matter.
Figure 4:
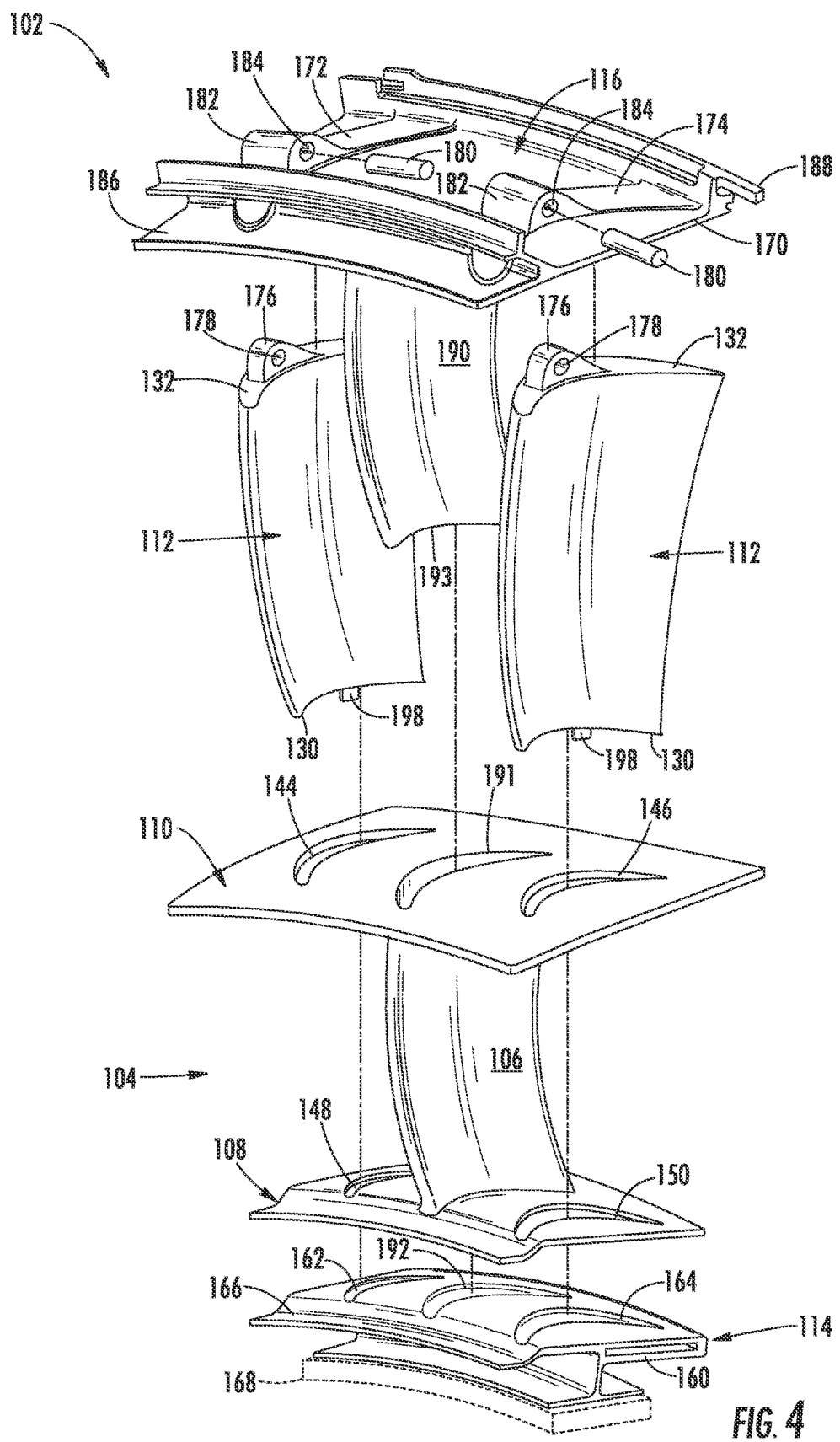
FIG. 4 illustrates an exploded view of the nozzle segment assembly shown in FIG. 3.
Figure 5:
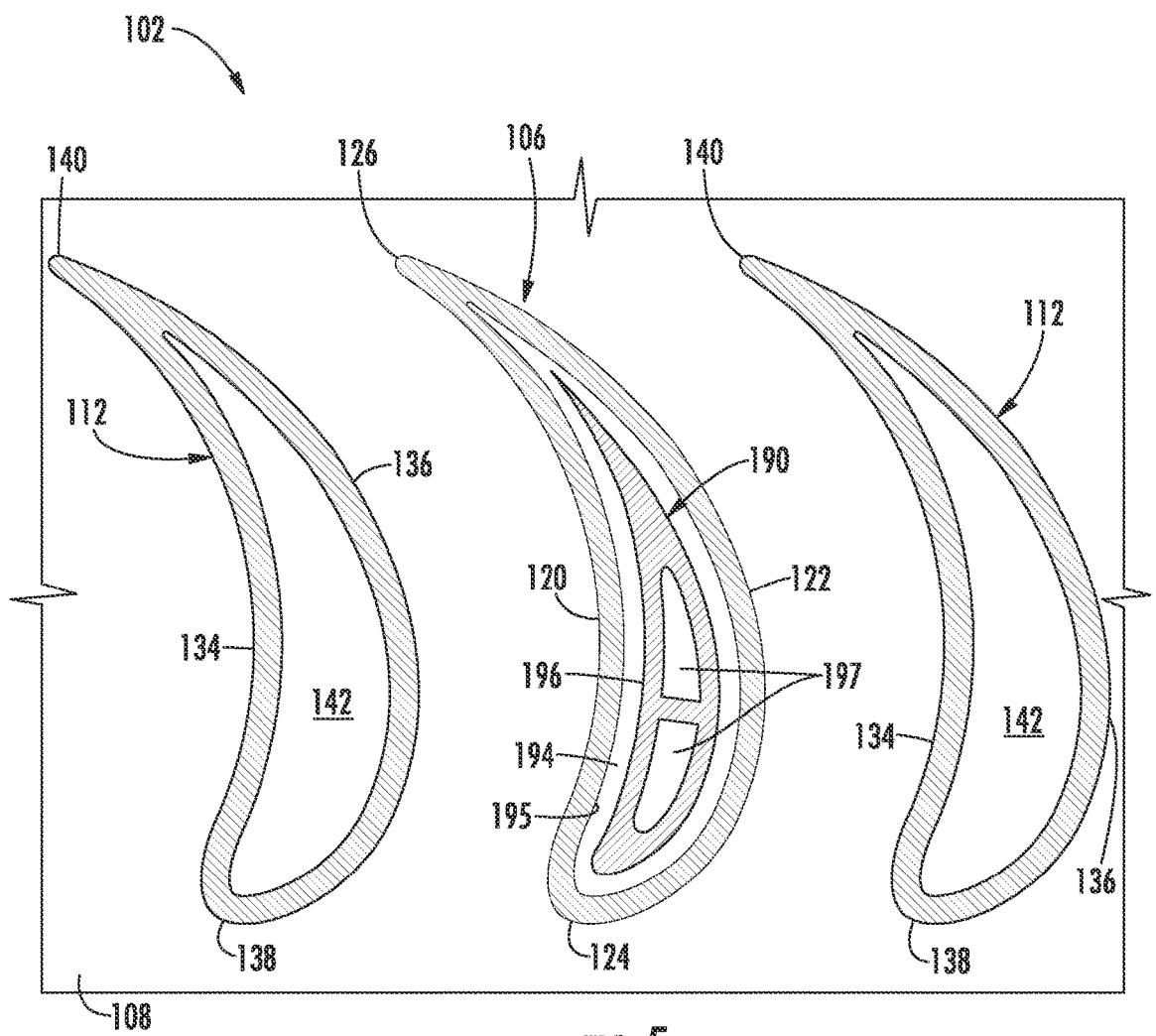
FIG. 5 illustrates a cross-sectional view of the nozzle segment assembly shown in FIG. 3 taken about line 5-5.

Referring now to FIGS. 3-5, several views of one of the nozzle segment assemblies 102 described above with reference to FIG. 2 are illustrated in accordance with aspects of the present subject matter. Specifically, FIG. 3 illustrates a perspective view of the nozzle segment assembly 102 and FIG. 4 illustrates an exploded of the nozzle segment assembly 102 shown in FIG. 4. Additionally, FIG. 5 illustrates a cross-sectional view of the nozzle segment assembly 102 shown in FIG. 3 taken about line 5-5.

As shown, the nozzle segment assembly 102 may include a nozzle fairing 104 configured to be positioned between an inner ring support segment 114 and an outer ring support segment 116. In general, the nozzle fairing 104 may include a strut vane 106 extending radially between an inner endwall 108 and an outer endwall 110. The strut vane 106 may be configured to define an aerodynamic cross-sectional profile, such as by defining any suitable airfoil-shape typically utilized for nozzle vanes within a gas turbine engine. For example, as shown in FIG. 5, the strut vane 106 may define an airfoil shape including a pressure side 120 and a suction side 122 extending between and a leading edge 124 and a trailing edge 126. Additionally, as shown in FIG. 5, the strut vane 106 may be configured to be hollow. As will be described below, such as a hollow configuration may allow for the vane 106 to receive a load-bearing strut of the nozzle segment assembly 102.

Moreover, as particularly shown in FIG. 4, the strut vane 106 may be configured to extend radially end-to-end between the inner and outer endwalls 108, 110. As a result, the inner and outer endwalls 108, 110 may generally be configured to define radially inner and outer flow path boundaries, respectively, for the hot gases of combustion flowing along the hot gas path of the turbine engine 10. For example, the combustion gases flowing past the strut vane 106 may generally be directed between inner and outer endwalls 108, 110 along the aerodynamic shape of the vane 106.

In several embodiments, the strut vane 106 and the endwalls 108, 110 may be configured to be formed as a single, unitary component. In such embodiments, the strut vane 106 and the endwalls 108, 110 may be formed integrally using any suitable manufacturing process known in the art. As indicated above, such components may, in one embodiment, be formed from a suitable CMC material. In such instance, any suitable process known for manufacturing components using CMC materials may be utilized to form the strut vane 106 and the endwalls 108, 110 as an integral component, such as injection molding, slip casting, tape casting, infiltration methods (e.g., chemical vapor infiltration, melt infiltration and/or the like) and various other suitable methods and/or processes. However, in an alternative embodiment, the strut vane 106 and the endwalls 108, 110 may be manufactured as separate components.

Additionally, as indicated above, the nozzle segment assembly 102 may also include one or more secondary vanes 112 configured to be supported between the inner and outer endwalls 108, 110. For example, in the illustrated embodiment, the nozzle segment assembly 102 is configured as a "triplet" design and, thus, includes first and second secondary vanes 112 configured to extend between the endwalls 108, 110 along opposite sides of the strut vane 106. However, in another embodiment, the nozzle segment assembly 102 may be configured as a "doublet" design. In such an embodiment, the nozzle segment assembly 102 may only include a single secondary vane 112 extending between the endwalls 108, 110 alongside the strut vane 106 (e.g., along one of the sides of the strut vane 106).

As shown in the illustrated embodiment, each secondary vane 112 may generally extend radially between an inner vane end 130 (FIG. 4) and an outer vane end 132 (FIG. 4) and may define an aerodynamic cross-sectional profile between its inner and outer ends 130, 132. For example, as shown in FIG. 5, the secondary vanes 112 may define the same or a similar aerodynamic shape as the strut vane 106, such as by defining a an airfoil-shape including a pressure side 134 and a suction side 136 extending between a leading edge 138 and a trailing edge 140. Additionally, in several embodiments, each secondary vane 112 may be configured to be hollow or substantially hollow so as to define one or more flow paths for providing a cooling medium (e.g., air) through the vane 112. For example, as shown in FIG. 5, each secondary vane 112 simply defines a single interior cavity 142 for receiving a cooling medium. However, in other embodiments, the secondary vanes 112 may define a plurality of interior channels for receiving a cooling medium (e.g., in a serpentine-like flow pattern within the interior of each vane 112). Alternatively, the secondary vanes 112 may be configured to define a solid cross-section.

When installing the secondary vanes 112 within the nozzle segment assembly 102, the vanes 112 may, in several embodiments, be configured to be inserted through one or both of the endwalls 108, 110. In this regard, the endwalls 108, 110 may define airfoil-shaped slots (or other suitably shaped slots) for receiving portions of the secondary vanes 112. For example, as shown in FIG. 4, the outer endwall 110 may define first and second outer slots 144, 146 for receiving corresponding portions of the first and second vanes 112, respectively, and the inner sidewall 108 may define first and second inner slots 148, 150 for receiving corresponding portions of the first and second vanes 112, respectively. In such an embodiment, the secondary vanes 112 may be positioned within the slots 144, 146, 148, 150 such that the inner vane end 130 of each vane 112 extends radially inwardly beyond the inner endwall 108 and the outer vane end 132 of each vane 112 extends radially outwardly beyond the outer endwall 110. As will be described below, by configuring the ends 130, 132 of the secondary vanes 112 to extend radially beyond the inner and outer endwalls 108, 110, the secondary vanes 112 may be configured to be attached to or secured within portions of the inner and outer ring support segments 114 116 to ensure that the vanes 112 are properly supported within the nozzle segment assembly 102.

It should be appreciated that, in several embodiments, the strut vane 106, the endwalls 108, 110 and the secondary vanes 112 may all be formed from a non-metallic material having a relatively low coefficient of thermal expansion. For instance, as indicated above, the strut vane 106, the endwalls 108, 110 and the secondary vanes 112 may all be formed from a CMC material. In such embodiments, the CMC material may generally correspond to any suitable CMC material known in the art and, thus, may generally include a ceramic matrix having a suitable reinforcing material incorporated therein to enhance the material's properties (e.g., the material strength and/or the thermo-physical properties). In one embodiment, the CMC material used may be configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used may be configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

As indicated above, the nozzle segment assembly 102 may also include an inner ring support segment 114 and an outer ring support segment 116. In several embodiments, the strut vane 106 and the endwalls 108, 110 of the nozzle fairing 104, along with the secondary vanes 112, may be configured to be sandwiched between the inner and outer ring support segments 114, 116. For example, as shown in the illustrated embodiment, the inner ring support segment 114 may generally correspond to the radially innermost portion of the nozzle segment assembly 102 and may be configured to be positioned directly adjacent to the inner endwall 108 when the various components are assembled together. Similarly, the outer ring support segment 116 may generally correspond to the radially outermost portion of the nozzle segment assembly 102 and may be configured to be positioned directly adjacent to the outer endwall 110 when the various components are assembled together.

In several embodiments, the inner ring support segment 114 may include an arcuate inner band segment 160 configured to be positioned directly adjacent to the inner endwall 108 such that the inner vane ends 130 of the secondary vanes 112 may be received within and/or coupled to portions of the inner band segment 160. For instance, as shown in FIG. 4, first and second vane recesses 162, 164 may be defined in an outer surface 166 of the inner band segment 160 for receiving the inner vane ends 130 of the first and second secondary vanes 112, respectively. Specifically, as indicated above, the secondary vanes 112 may be configured to extend through the inner endwall 108 such that the inner vane end 130 of each vane 112 projects radially inwardly from the inner endwall 108. In such an embodiment, the inner vane ends 130 of the secondary vanes 112 may be received within the corresponding vane recesses 162, 164 defined by the inner band segment 160 for supporting the secondary vanes 112 within the assembly 102.

It should be appreciated that, in several embodiments, the inner vane ends 130 of the secondary vanes 112 may be configured to be axially and/or circumferentially constrained within the vane recesses 162, 164 while still being allowed to freely move radially relative to the inner band segment 102. As shown in FIG. 4, in one embodiment, such axial and/or circumferential constraint of the inner vane ends 130 of the secondary vanes 112 may be accomplished via a tab 198 extending radially outwardly from the inner vane end 130 of each secondary vane 112.

Additionally, in several embodiments, the inner ring support segment may include or be coupled to an inter-stage sealing mechanism 168 (shown in dashed lines) extending outwardly from the inner band segment 160. In such embodiments, the inter-stage sealing mechanism 168 may be configured to have any suitable configuration known in the art for allowing the mechanism 168 to provide sealing between adjacent rotor disks and/or between a rotor disk and a separate structure of the gas turbine engine 10. For example, the inter-stage sealing mechanism 168 may include one or more honeycomb elements for sealing against corresponding rotor teeth or other projections extending outwardly from the adjacent rotor disk(s) of the gas turbine engine 10.

As shown in the illustrated embodiment, the outer ring support segment 116 of the nozzle segment assembly 102 may generally include an arcuate outer band segment 170 configured to be positioned directly adjacent to the outer endwall 110 such that the outer vane ends 132 of the secondary vanes 112 may be received within and/or coupled to portions of the outer band segment 170. For instance, in several embodiments, first and second vane recesses 172, 174 may be defined in an inner surface (not shown) of the outer band segment 170 for receiving the outer vane ends 132 of the first and second secondary vanes 112, respectively. Specifically, as indicated above, the secondary vanes 112 may be configured to extend through the outer endwall 110 such that the outer vane end 132 of each secondary vane 112 projects radially outwardly from the outer endwall 110. In such an embodiment, the outer vane ends 132 of the first and second secondary vanes 112 may be received within the corresponding vane recesses 172, 174 defined by the outer band segment 170 for supporting the secondary vanes 112 within the assembly 102.

It should be appreciated that, in several embodiments, the outer vane ends 132 of the secondary vanes 112 may be configured to be secured within the vane recesses 172, 174 using any suitable attachment means and/or method. For example, as shown in the illustrated embodiment, each outer vane end 132 may include a mounting tab 176 configured to project radially outwardly therefrom. As particularly shown in FIG. 4, each mounting tab 176 may define a through-hole 178 configured to receive a mounting pin 180. In such an embodiment, the recesses 172, 174 defined in the outer band segment 170 may be shaped or otherwise formed so as to accommodate mounting the secondary vanes 112 to the outer ring support 116 through a pinned connection via the mounting pins 180. For example, as shown in FIGS. 3 and 4, each recess 172, 174 may include a raised portion 182 configured to receive the mounting tab 176 of the corresponding vane 112. In addition, a through-hole 184 may be defined through the raised portion 182 of each recess 172, 174 that is configured to be aligned with the through-hole 178 defined in each mounting tab 176 when the outer vane ends 132 of the secondary vanes 112 are received within the recesses 172, 174. As such, a mounting pin 180 may be inserted through the aligned through-holes 178, 184 to secure each secondary vane 112 to the outer ring support segment 116. In alternative embodiments, it should be appreciated that the outer vane ends 132 of the secondary vanes 112 may be secured within the recesses 172, 174 using any other suitable attachment means, such as by bolting the ends 132 within each recess 172, 175.

It should also be appreciated that the outer band segment 170 may also include suitable features for mounting and/or sealing the outer ring support segment 116 to a static structure (not shown) within the gas turbine engine 10. For example, as shown in FIG. 4, both a forward end 186 and an aft end 188 of the outer band segment 170 may include features, such as slots, grooves, tabs and/or the like, for mounting/sealing the outer ring support segment 116 within the gas turbine engine 10.

Additionally, as particularly shown in FIG. 4, the outer ring support segment 116 may also include a cantilevered strut 190 extending radially inwardly from the outer band segment 170. Specifically, in several embodiments, the strut 190 may be configured to extend radially inwardly from the outer band segment 170 though the hollow interior of the strut vane 106 to the inner ring support segment 114. As a result, the strut 190 may be configured to serve as the primary load-bearing component for the nozzle fairing 104. Specifically, mechanical loads applied through the nozzle fairing 104 may be transferred to the strut 190 and carried radially outwardly to the outer band segment 170, at which point the loads may be transferred to the static structure to which the outer ring support segment 116 is coupled.

As shown in FIG. 4, to allow the strut 190 to be received within the strut vane 106, strut openings 191 may be defined through the inner and outer endwalls 108, 110 (only the strut opening 191 defined through the outer endwall 110 being shown) that are aligned with the interior cavity of the strut vane 106. Thus, when assembling the various components of the disclosed assembly 102, the strut 190 may be inserted into the interior cavity of the strut vane 106 via the strut opening 191 defined in the outer endwall 10. In addition, a strut recess 192 may be defined in the inner band segment 160 of the inner ring support segment 114 that is configured to receive a free or tip end 193 of the strut 190. Specifically, in several embodiments, when the strut 190 is inserted fully within the nozzle fairing 104 (e.g., such that the outer band segment 170 contacts or is otherwise positioned directly adjacent to the outer endwall 110), the tip end 193 of the strut 190 may project radially inwardly from the inner endwall 108. In such embodiments, the tip end 193 may be received within the strut recess 192 defined by the inner band segment 160 to allow the strut 190 to be coupled between the outer and inner ring support segments 114, 116. For example, the tip end 193 of the strut 190 may be secured within the strut recess 192 using a pinned connection, by brazing or welding the tip end 193 within the recess 192 and/or by using any other suitable attachment means and/or method.

It should be appreciated that, in several embodiments, the strut 190 and the outer band segment 170 of the outer ring support 116 may be configured to be formed as a single, unitary component. In such embodiments, the strut 190 and the outer band segment 170 may be formed integrally using any suitable manufacturing process known in the art, such as casting, molding, machining, etc. However, in an alternative embodiment, the strut 190 and the outer band segment 170 may be manufactured as separate components. In such an embodiment, the strut 190 may be configured to be coupled to the outer band segment 170 using any suitable means and/or method that allows the strut to be cantilevered from the outer band segment 170.

It should also be appreciated that, in several embodiments, both the strut 190 and the outer band segment 170 may be formed from a metallic material. For example, suitable metallic materials may include, but are not limited to, single-crystal and non-single-crystal nickel alloys.

Additionally, in several embodiments, the strut 190 may generally be configured to define an aerodynamic, airfoil-shaped cross-section. Specifically, as shown in FIG. 5, the strut may define a cross-sectional shape generally corresponding to the aerodynamic cross-sectional shape of the strut vane 106. However, in other embodiments, the strut 190 may define any other suitable shape that allows it to be inserted within the strut vane 106.

Moreover, in several embodiments, one or more flow paths may be defined around and/or in the strut 190 for receiving a cooling medium within the strut vane 106 for cooling the vane 106 and/or the strut 190. For example, as shown in FIG. 5, a gap 194 may be defined between an inner surface 195 of the strut vane 106 and an outer surface 196 of the strut 190 that defines a flow path for receiving a cooling medium between the strut vane 106 and the strut 190. In addition, as shown in FIG. 5, the strut 190 may define one or more internal cooling channels 197 for receiving a cooling medium within the strut 197. In such an embodiment, the internal cooling channels 197 may be fluidly isolated from the gap 194 defined between the strut vane 106 and the strut 190. Alternatively, the internal cooling channels 197 may be in fluid communication with the gap 194. For example, suitable cooling holes (not shown) may be defined through the strut 190 between its outer surface 196 and the cooling channel(s) 197 for directing a portion of the cooling medium flowing through the cooling channel(s) 197 into the gap 194.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nozzle segment assembly for a gas turbine engine, the nozzle segment assembly comprising:
    an outer ring support segment and an inner ring support segment;
    a nozzle fairing positioned between the inner and outer ring support segments, the nozzle fairing being formed from a ceramic matrix composite (CMC) material, the nozzle fairing including an outer endwall configured to be positioned adjacent to the outer ring support segment and an inner endwall configured to be positioned adjacent to the inner ring support segment, the nozzle fairing further comprising a strut vane extending between the inner and outer endwalls;
    a metallic strut extending through the strut vane between the outer and inner ring support segments; and
    at least one secondary vane configured to be received through at least one of the outer endwall or the inner endwall of the nozzle fairing such that the at least one secondary vane extends between the inner and outer endwalls at a location adjacent to the strut vane,
    wherein the metallic strut is cantilevered extending radially inwardly from the outer ring support segment,
    wherein the at least one secondary vane is simply supported between the outer ring support segment and the inner ring support segment, and
    wherein the strut vane is integrally formed with the inner endwall and the outer endwall.

2. The nozzle segment assembly of claim 1, wherein the outer endwall defines an outer slot and the inner endwall defines an inner slot, wherein separate portions of the at least one secondary vane are configured to be received within the outer and inner slots, and
    wherein the nozzle segment assembly is a triplet vane, the triple vane comprising;
        two of the at least one secondary vanes at the outer portions of the triplet vane; and
        the strut vane located at the center of the triplet vane.

3. The nozzle segment assembly of claim 2, wherein the at least one secondary vane extends radially between an outer vane end and an inner vane end, the at least one secondary vane being configured to extend through the inner and outer slots such that the outer vane end extends radially outwardly from the outer endwall and the inner vane end extend radially inwardly from the inner endwall.

4. The nozzle segment assembly of claim 3, wherein the outer vane end is configured to be received within a vane recess defined in the outer ring support segment.

5. The nozzle segment assembly of claim 4, wherein the at least one secondary vane comprises a mounting tab extending from the outer vane end, the mounting tab defining a through-hole configured to receive a mounting pin for coupling the at least one secondary vane to the outer ring support segment, and
wherein the mounting tab of the at least one secondary vane is received within a raised portion of a second vane recess defined in the outer ring support segment, the raised portion comprising a second through-hole corresponding to the through-hole of the mounting tab and configured to receive the mounting pin.

6. The nozzle segment assembly of claim 3, wherein the inner vane end is configured to be received within a vane recess defined in the inner ring support segment.

7. The nozzle segment assembly of claim 6, wherein the inner vane end is configured to be coupled within the recess.

8. The nozzle segment assembly of claim 1, wherein the inner and outer endwalls and the strut vane are formed integrally as a single unitary component.

9. The nozzle segment assembly of claim 1, wherein the metallic strut extends radially inwardly from the outer ring support segment through the strut vane.

10. The nozzle segment assembly of claim 9, wherein the outer ring support segment comprises an outer band segment, the metallic strut and the outer band segment being formed integrally as a single unitary component.

11. The nozzle segment assembly of claim 9, wherein the metallic strut extends radially inwardly from the outer ring support segment to a tip end, the tip end being configured to be received within a strut recess defined in the inner ring support segment.

12. The nozzle segment assembly of claim 1, wherein a gap is defined between an inner surface of the strut vane and an outer surface of the strut when the strut is received within the strut vane.

13. The nozzle segment assembly of claim 12, wherein the gap is configured to receive a cooling medium for cooling at least one of the strut vane or the strut.

14. A gas turbine engine, comprising:
a compressor;
a combustor in flow communication with the compressor; and
a turbine configured to receive combustion products from the combustor, the turbine including a turbine nozzle having an annular array of nozzle segment assemblies, each of the nozzle segment assemblies comprising:
an outer ring support segment and an inner ring support segment;
a nozzle fairing positioned between the inner and outer ring support segments, the nozzle fairing being formed from a ceramic matrix composite (CMC) material, the nozzle fairing including an outer endwall configured to be positioned adjacent to the outer ring support segment and an inner endwall configured to be positioned adjacent to the inner ring support segment, the nozzle fairing further comprising a strut vane extending between the inner and outer endwalls;
a metallic strut extending through the strut vane between the outer and inner ring support segments; and
at least one secondary vane configured to be received through at least one of the outer endwall or the inner endwall of the nozzle fairing such that the at least one secondary vane extends between the inner and outer endwalls at a location adjacent to the strut vane,
wherein the metallic strut is cantilevered extending radially inwardly from the outer ring support segment,
wherein the at least one secondary vane is simply supported between the outer ring support segment and the inner ring support segment, and
wherein the strut vane is integrally formed with the inner endwall and the outer endwall.

15. The gas turbine engine of claim 14, wherein the outer endwall defines an outer slot and the inner endwall defines an inner slot, wherein separate portions of the at least one secondary vane are configured to be received within the outer and inner slots.

16. The gas turbine engine of claim 15, wherein the at least one secondary vane extends radially between an outer vane end and an inner vane end, the at least one secondary vane being configured to extend through the inner and outer slots such that the outer vane end extends radially outwardly from the outer endwall and the inner vane end extend radially inwardly from the inner endwall, and
wherein each nozzle segment assembly is a triplet vane, the triple vane comprising;
two of the at least one secondary vanes at the outer portions of the triplet vane; and
the strut vane located at the center of the triplet vane.

17. The gas turbine engine of claim 16, wherein the outer vane end is configured to be received within a vane recess defined in the outer ring support segment, the at least one secondary vane comprising a mounting tab extending from the outer vane end, the mounting tab defining a through-hole configured to receive a mounting pin for coupling the at least one secondary vane to the outer ring support segment, and
wherein the mounting tab of the at least one secondary vane is received within a raised portion of a second vane recess defined in the outer ring support segment, the raised portion comprising a second through-hole corresponding to the through-hole of the mounting tab and configured to receive the mounting pin.

18. The gas turbine engine of claim 17, wherein the inner vane end is configured to be received within a vane recess defined in the inner ring support segment.

19. The gas turbine engine of claim 18, wherein the inner and outer endwalls and the strut vane are formed integrally as a single unitary component.

20. The gas turbine engine of claim 19, wherein the metallic strut extends radially inwardly from the outer ring support segment through the strut vane to a tip end, the tip end being configured to be received within a strut recess defined in the inner ring support segment.

* * * * *